Figure 1:
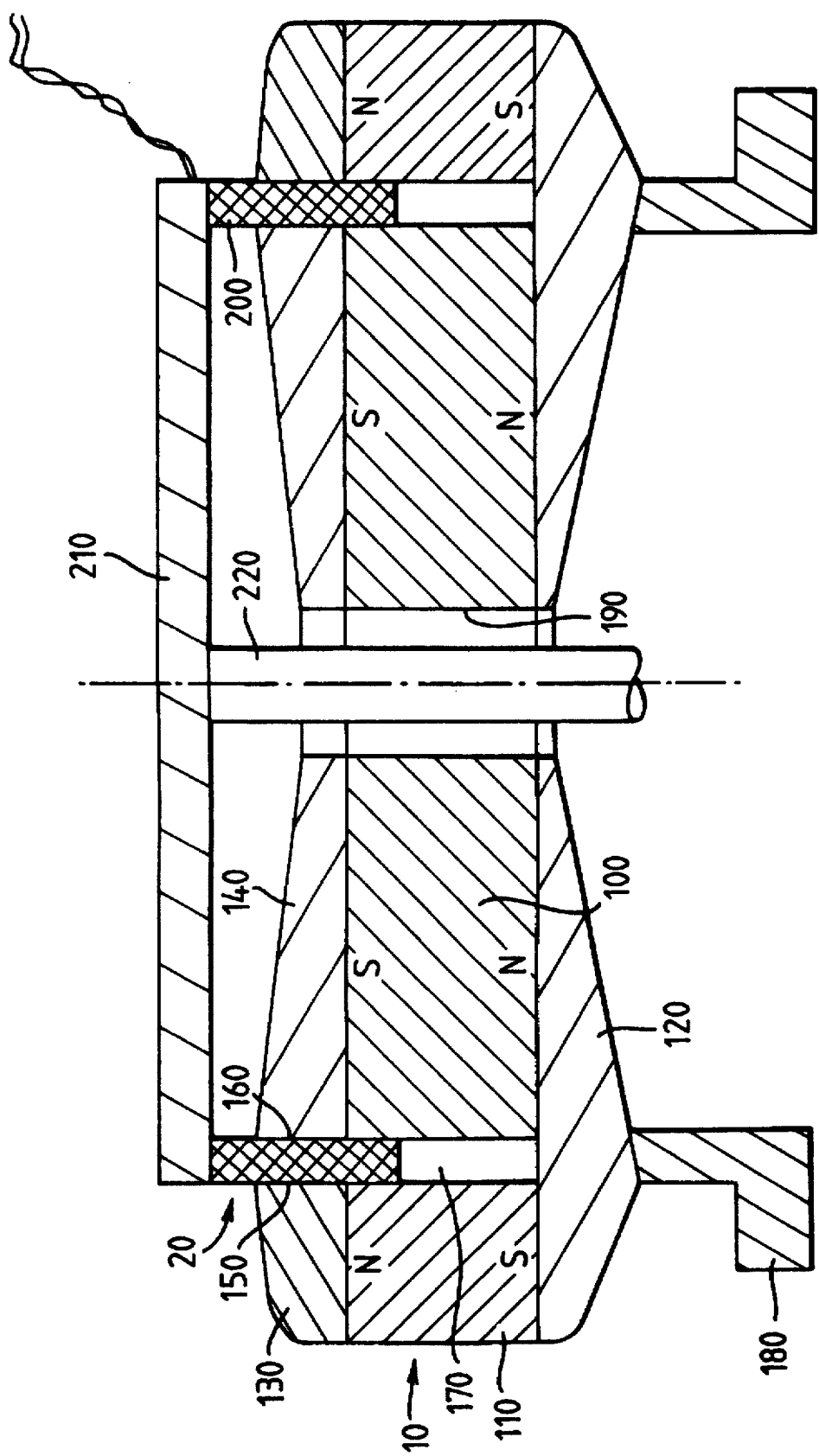

United States Patent

Orlowska et al.

Patent Number: 5,701,040
Date of Patent: Dec. 23, 1997

[54] MAGNET ARRANGEMENT, AND DRIVE DEVICE AND COOLING APPARATUS INCORPORATING SAME

[75] Inventors: Anna Helena Orlowska, Oxford; Thomas William Bradshaw, East Hanney; David Elwyn Baynham, Didcot, all of England

[73] Assignee: British Technology Group Limited, London, England

[21] Appl. No.: 416,895

[22] PCT Filed: Nov. 1, 1993

[86] PCT No.: PCT/GB93/02245

§ 371 Date: Apr. 12, 1995

§ 102(e) Date: Apr. 12, 1995

[87] PCT Pub. No.: WO94/10741

PCT Pub. Date: May 11, 1994

[30] Foreign Application Priority Data

Nov. 3, 1992 [GB] United Kingdom ............... 9222971

[51] Int. Cl.⁶ .................................................. H02K 33/18
[52] U.S. Cl. ................................................. 310/13; 310/12
[58] Field of Search .......................................... 310/12, 13

[56] References Cited

U.S. PATENT DOCUMENTS

| | | | |
|---|---|---|---|
| 3,896,319 | 7/1975 | Chari | 310/13 |
| 4,075,517 | 2/1978 | Adler | 310/13 |
| 4,603,270 | 7/1986 | Van Davelaar | 310/13 |
| 5,434,458 | 7/1995 | Stuart et al. | 310/13 |

FOREIGN PATENT DOCUMENTS

| | | | |
|---|---|---|---|
| 1130512 | 5/1962 | Germany | H02K 21/23 |
| 3032308 | 4/1981 | Germany | H02K 33/18 |
| 8401864 | 5/1984 | WIPO | H02K 41/02 |

OTHER PUBLICATIONS

Patent Abstracts of Japan, vol. 4, No. 109 (E-20) (591) 6 Aug. 1980 & JP,A 55 066 264 (Sawafuji Denki) 19 May 1980—See abstract.

*Primary Examiner*—Thomas M. Dougherty
*Assistant Examiner*—B. Mullins
*Attorney, Agent, or Firm*—Cushman, Darby & Cushman IP Group of Pillsbury Madison & Sutro LLP

[57] ABSTRACT

A linear motor (220) suitable for use with a cryogenic cooler is described. The arrangement comprises first and second annular magnets (100 and 110), which in the preferred embodiment are nested and share a common axis. A circular bore (190) is defined about the common axis and is able to receive a drive shaft (220). The drive shaft (220) is connected to a base member (210) which has an annular peripheral region (200) in which a coil (200) is defined. Coil (200) has poles (150 and 160). The coil (200) when energised causes reciprocal motion of the drive shaft (220). The coil (200) per se is able to move into and out of an annular cavity (170) defined between the nested magnets (100 and 110).

8 Claims, 2 Drawing Sheets

MAGNET ARRANGEMENT, AND DRIVE DEVICE AND COOLING APPARATUS INCORPORATING SAME

This invention relates to a magnet arrangement, to a drive device incorporating the magnet arrangement, and to cooling apparatus incorporating the drive device.

The invention relates more particularly to a drive device of the "loudspeaker" type, incorporating a magnet arrangement comprising a right circularly cylindrical permanent magnet, and a circularly cylindrical soft iron yoke which includes a pair of poles defining an annular magnet pole gap. The drive device incorporating this magnet arrangement includes an annular coil which can cooperate with the pole gap and which is powered by an alternating current to reciprocate the coil relative to the magnet arrangement.

Such a drive device may be utilised in loudspeakers or some types of linear motors, but a particularly important use is in Stirling Cycle cooling devices. Stirling Cycle coolers are particularly useful for refrigeration in environments, such as outer space, where a low weight, high reliability device is required. A typical use would be for cooling the sensor (and possibly the optics) of an infrared camera. Other possible uses of such a cooler are in cooling superconducting devices such as SQUIDS and in reliquefying the helium in Magnetic Resonance Imaging Machines.

A magnet arrangement, drive device and cooling apparatus of the above type are known from International Patent Application No. PCT/GB90/00592. FIG. 1 of this document discloses a conventional loudspeaker type drive device. It will be noted that the yoke comprises an upper disc-shaped member fixed to one face of the disc-shaped permanent magnet and a member which is "c"-shaped in cross-section, the central portion of the "c" being disc-shaped and fixed to the other face of the magnet, the outer limbs of the "c" extending outwardly beyond the periphery of the magnet, upwardly and finally inwardly to define an annular pole gap with the periphery of the upper member.

Whilst such a drive device operates satisfactorily, it would be desirable to produce a device of considerably higher power but of similar weight and size. Especially for outer space applications, higher power and low weight are paramount considerations; power on board a spacecraft is severely limited, as is payload capacity.

U.S. Pat. No. 4,075,517 (ADLER) describes a linear motor for disk drives arranged so that several disks can be accessed using the same motor system. Several loudspeaker coils are arranged concentrically between the poles of a conventional loudspeaker drive. The spaces between the coils are filled with ferromagnetic annular poles to keep the magnetic field lines under control across what would be a large air gap. No references is made about the efficiency of the system.

DE-A-3032308 (Yeda Research and Development Company) appears to be a vibration free compressor. FIG. 3 shows an arrangement consisting of two outer and two inner radially magnetised permanent magnets. Soft iron annuli are used inside and outside the permanent magnets in order to channel the flux. Two connected drive coils are used to take advantage of the flux reversal from the top half of the permanent magnet circuit to the bottom half. This linear drive would be difficult to manufacture as the radially magnetised magnets would have to be segmented. The flux reversal between the top and bottom halves of the magnet would cause problems with the field strength and direction.

EP-A1-0494653 describes a linear actuator suitable for a cryogenic cooler. The arrangement comprises first and second pistons arranged to reciprocate within a cavity, the axes of the two pistons being colinear. Each piston has an associated electro-magnet. The magnetic flux distribution may not be spatially constant.

The present invention differs from the arrangement described in EP-A1-0494653, in that it comprises spaced magnets between whose poles is a uniform magnetic flux distribution. This occurs partly as a result of magnetic ballast/shielding provided by a precisely dimensioned yoke. Thus superior control of axial displacement of a drive shaft is achievable. Furthermore as a result of the shape and position of the yoke very little magnetic flux leakage occurs and the magnetic field to weight ratio of the device is high.

According to the present invention, there is provided a magnet arrangement comprising first and second spatially separate magnet devices for producing a magnetic field, and means for magnetically connecting the first and second devices together such that a magnetic circuit is formed which includes a pair of magnet poles defining a magnet pole gap, such gap being located in the circuit between the first and second magnet devices.

This arrangement can produce a larger magnetic field than could be produced with just one magnet device, whilst enabling the weight and volume gain caused by the use of a further magnet or magnets to be minimised. By providing spatially separate magnet devices, and with a judicious choice of connecting means, the magnet devices can be arranged with respect to each other such that the weight and volume of connecting material are appreciably less than what they would be if only a single permanent magnet were used (as is the case with the prior art arrangement), since the second, separate magnet device can replace part of the connecting material used in the prior art arrangement. Furthermore, since the connecting means can be shorter, the reluctance of the magnetic circuit can be kept to a minimum.

Preferably, the second magnet device surrounds the first device. This can provide a particularly compact and weight saving configuration. In the known loudspeaker type magnet arrangement, the first device is surrounded by an annulus of connecting material. Since this material is at the maximum radius of the arrangement, its weight and volume are particularly high. By providing that a further magnet device surrounds the first magnet device (hence replacing much or all of the annular connecting material), a larger magnetic field can be produced with minimal (if any) weight gain.

In the preferred embodiment, the magnet pole gap and/or the second magnet device may be generally annular, the first magnet device may be generally cylindrical, and both magnet devices and the magnet pole gap may possess circular symmetry and/or be concentric; further, both magnet devices may lie in the same plane. Any or all of these features can contribute to a more powerful but not substantially heavier magnet arrangement than the known loudspeaker type arrangement.

It will be appreciated that, as used herein, the terms "annular" and "cylindrical" are used in their widest sense, to connote geometries other than those possessing circular symmetry. The term "cylindrical" includes both solid and hollow cylinders. For instance, usually the first magnetic device would be a relatively thin circular disc having a central bore. Such a device falls within the present definition of "cylindrical".

It has been found pursuant to the present invention that, in many circumstances, field strength and weight are optimised if the thicknesses of both magnet devices are substantially equal.

If the second magnet device is generally annular, the connecting means preferably includes an annular connecting portion mounted on one side of this device, and this connecting portion preferably generally tapers towards the second device adjacent its outer periphery. The tapering of the connecting portion can save weight over an arrangement in which the connecting portion has a sharp edge at its outer periphery, without the reluctance of the magnetic circuit being adversely affected.

Similarly, if the first magnet device is generally cylindrical, the connecting means preferably includes a connecting portion mounted on one side of the first device, and such connecting portion preferably generally tapers towards the first device adjacent its centre.

The connecting portions referred to above may either be parts of a larger connecting member or may be separate members, dependent on their position in the magnetic circuit.

The first and second magnet devices may be electromagnetic but preferably each comprise one of more permanent magnets. If more than one permanent magnet is employed, appropriate elements may be required to connect the magnets together magnetically.

If the magnet devices lie in the same plane, preferably they are arranged such that the magnetic fields in the devices are generally perpendicular to said plane. By this arrangement less connecting material need be used than if, for instance, the fields were generally parallel with the plane.

Whilst the connecting means may be made of permanently magnetised material, it is preferably formed of ferromagnetic material.

Preferably, the total flux produced by the first magnet device is substantially equal to that produced by the second device. In this way, the magnetic field strength across the pole gap can be maximised, in that the flux from the two devices is balanced.

If the devices comprise permanent magnets, it is advantageous that the cross-sectional area of the permanent magnet in the first device, or the combined cross-sectional area of each permanent magnet, in a plane perpendicular to the magnetic field in the first device, is substantially equal to the corresponding cross-sectional area in the second device. Thus it can be ensured that the fields of the two magnet devices are matched.

The invention extends to a drive device comprising a magnet arrangement as aforesaid and a coil arrangement adapted to be electrically powered to effect relative drive motion between the coil arrangement and the magnet arrangement.

The invention further extends to cooling apparatus comprising the drive device and a cooling device driveable by the drive device.

Figure 2:
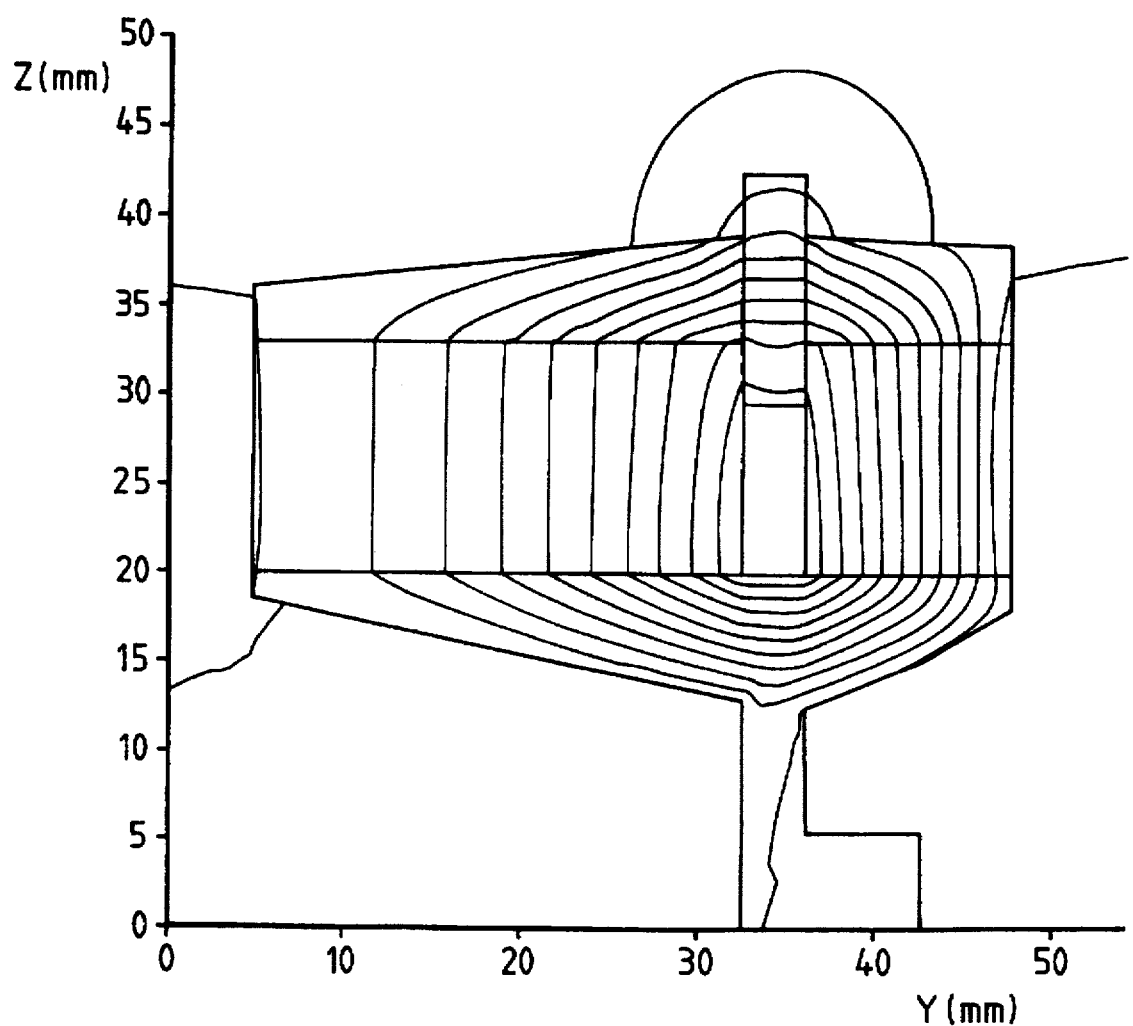

Preferred features of the invention are now described, by way of example only, with reference to the accompanying drawings, in which:

FIG. 1 is a side elevational, cross-sectional view of a drive device according to the present invention; and FIG. 2 shows a simulation of the magnetic field in such a device.

Referring to FIG. 1, a drive device according to the present invention comprises in general terms a magnet arrangement 10 and a coil arrangement 20.

The magnet arrangement 10 includes an inner cylindrical permanent magnet 100, an outer annular permanent magnet 110, a lower disc-shaped yoke piece 120 fixed to the lower faces of magnets 100 and 110 to form a magnetic connection therebetween, upper, outer, annular yoke piece 130 fixed to the upper face of the outer magnet 110, and upper, inner disc-shaped yoke piece 140 fixed to the upper face of cylindrical magnet 100.

The two permanent magnets 100 and 110 are both high specification Nd—Fe—B magnets, each capable of producing magnetic fields of 1.05 to 1.07 Tesla. Their fields are orientated as shown in FIG. 2. The magnets are each 13 mm thick in the present embodiment. The cross-sectional area of the magnets is the same, so that their flux densities are matched to provide the magnetically most efficient arrangement. The combined peak magnetic field produced by the magnets has been found experimentally to be 1.21 Tesla. It will be appreciated that the outer magnet 110 is not significantly heavier or larger than the yoke material which it replaces in the known loudspeaker magnet arrangement, but produces a significantly enhanced magnetic field.

The yoke pieces 120, 130 and 140 are made from soft iron, PERMENDUR (trade mark), or some other high permeability, low weight material, such as material consisting of 49% Co, 49% Fe and 2% V. It has been found experimentally that this last material can increase the peak magnetic field by roughly 10% over the value obtained using a soft iron yoke. This material does not reach saturation until 2.2–2.4 Tesla, whereas soft iron saturates at 2.1 Tesla.

The outer and inner yoke pieces 130 and 140 respectively form the poles 150, 160 defining a pole gap 170. A gap length (in the direction of the cylinder axis) of 9.5 mm has been found to be optimal based on a radius for the inner magnet 100 of 32 mm. The gap is 4 mm wide, and is chosen to be sufficiently large that stray fields do not arise between the permanent magnets 100 and 110.

The various yoke pieces are dimensioned and shaped to reduce the weight of the magnet arrangement. The dimensioning is effected with the overall aim that the flux density is substantially even over the entire magnetic circuit, and a little below the saturation point. This provides a near-minimum weight configuration.

The shaping is effected so as to ensure that regions of the yoke pieces bearing only a low flux density are omitted, and that no part of the yoke pieces is magnetically saturated. Thus the lower disc-shaped yoke piece 120 tapers towards the outer permanent magnet 110 adjacent its outer periphery to form a rounded edge. It will be appreciated that without tapering a region of the pole piece with a relatively low flux density would have existed. It is noted that flux density decreases as radial distance from the centre of the magnet arrangement increases. The tapering also prevents "pinching" of the flux. Again, the lower yoke piece 120 tapers towards the inner magnet 100 adjacent its centre, in fact right from a location adjacent the outer periphery of this inner magnet. Hence the thickness of the yoke piece is less in areas where the magnetic circuit collects less flux from the inner magnet 100. The thickness of the yoke piece 120 at its very centre is chosen to be sufficient to afford some structural strength to the magnet arrangement. Similar design considerations apply to the upper yoke pieces 130 and 140 as to the lower yoke piece 120.

The magnet arrangement 10 includes a circularly symmetrical foot 180 for attaching the arrangement to cooling apparatus (not shown). Since the foot is not required to form part of the magnetic circuit, it is made of a non-magnetic material, Aluminium, in order to save weight over a magnetic material such as soft iron.

In an alternative embodiment of magnet arrangement, the outer magnet 110 is of greater thickness than the inner magnet 100 so that its upper face is co-extensive with that of the inner disc-shaped yoke piece 140. The upper outer annular yoke piece 130 is replaced by an annular yoke piece fixed to the inside of the outer magnet 110 adjacent its upper face. This reduces the risk of stray fields arising between the permanent magnets 100 and 110, but somewhat increases the weight of the magnet arrangement.

The coil arrangement 20 comprises an annular electromagnetic coil 200 attached to a base member 210 bearing a drive shaft 220 projecting through a central bore 190 in the magnet arrangement. The annular coil 200 forms a close sliding fit within the pole gap 170. It is sufficiently short that, at all positions during its stroke, it experiences all of the magnetic field in the pole gap 170. It will be understood that the coil arrangement 20 is of generally conventional construction; it will therefore not be discussed further.

In use, the drive device (comprising the magnet arrangement 10 and coil arrangement 20) is arranged to provide reciprocating drive motion via the drive shaft 220 to a Stirling Cycle cooler (not shown) by means of alternating current power being supplied to the coil arrangement. The frequency of the alternating current is usually 30 to 60 Hz, but may be much higher (for instance, audio frequency).

Referring now to FIG. 2, there is shown in this figure a computational, finite element analysis of the magnetic field in one half of the magnet arrangement according to the present invention. It should be noted that the magnet arrangement differs from that shown in FIG. 1, in that the outer annular yoke piece has less rounding and the foot 180 is made of a magnetic material. FIG. 2 also provides scales in the axial (Z) and radial (Y) directions.

It can be seen that the shaping of the yoke pieces has ensured that there are few regions in the yoke pieces where the field is relatively small. This indicates that the size and therefore the weight of the yoke pieces is near its minimum practicable value. FIG. 2 also indicates that there is little stray field either between the two magnets or exteriorly of the magnet arrangement.

It will be understood that the invention has been described above purely by way of example and that modifications of detail can be made within the scope of the invention.

We claim:

1. A magnet arrangement comprising an annular coil and a first generally circularly symmetric cylindrical permanent magnet device and a second generally circularly symmetric cylindrical permanent magnet device, each having opposite magnetic poles at opposite ends of the cylinder, the first device being nested inside the second device in a substantially coaxial relationship; and a first connecting means magnetically connecting the two devices together at one pair of magnetic poles such that a magnetic circuit is formed, and a second annular connecting means and a third connecting means magnetically connected with the other magnetic poles of the second and first devices, respectively, so as to define a magnet pole gap said gap being located in the circuit between poles of the second and third connecting means, the magnet pole gap being adapted to receive the coil which is movable, upon being electrically powered, in an axial direction so as to define a stroke, wherein the magnetic field is homogeneous throughout substantially the entire length of the magnet pole gap in an axial direction, thereby ensuring that at any position during the stroke of the coil, the coil experiences a substantially constant magnetic field, wherein the first device is hollow, the first connecting means is in the form of an annulus having a periphery from which a first surface tapers towards the axis of symmetry of the arrangement and a second surface tapers away from the axis of symmetry of the arrangement, the second connecting means tapers away from the axis of symmetry of the arrangement and the third connecting means is annular and tapers towards the axis of symmetry.

2. An arrangement according to claim 1 wherein both permanent magnet devices lie in the same plane.

3. An arrangement according to claim 2 wherein the thicknesses of both permanent magnet devices in a direction normal to said plane are substantially equal.

4. An arrangement according to claim 1, wherein clearance is provided between the first and second devices sufficient to avoid any substantial magnetic leakage between such devices.

5. An arrangement according to claim 1, wherein both devices lie in the same plane, and the magnetic fields in such devices are generally perpendicular to said plane.

6. An arrangement according to claim 1, wherein the connecting means is formed of ferromagnetic material.

7. An arrangement according to claim 1, wherein the cross-sectional area of the permanent magnet, in a plane perpendicular to the magnetic field in the first device, is substantially equal to the corresponding cross-sectional area in the second device.

8. Cooling apparatus comprising an arrangement according to anyone of claim 1, 2, 3, 4–6 or 7 and a cooling device driveable by the arrangement.

* * * * *